(12) United States Patent
Minami et al.

(10) Patent No.: US 9,670,358 B2
(45) Date of Patent: Jun. 6, 2017

(54) POLYESTER RESIN COMPOSITION, AND MOLDED ARTICLE CONTAINING SAID RESIN COMPOSITION

(71) Applicant: KANEKA CORPORATION, Osaka-shi (JP)

(72) Inventors: Tetsuya Minami, Settsu (JP); Noriyuki Suzuki, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/767,144

(22) PCT Filed: Jan. 16, 2014

(86) PCT No.: PCT/JP2014/000188
§ 371 (c)(1),
(2) Date: Aug. 11, 2015

(87) PCT Pub. No.: WO2014/125764
PCT Pub. Date: Aug. 21, 2014

(65) Prior Publication Data
US 2015/0368461 A1    Dec. 24, 2015

(30) Foreign Application Priority Data
Feb. 12, 2013 (JP) ................. 2013-024591

(51) Int. Cl.
C08L 67/04 (2006.01)
C08K 5/053 (2006.01)
C08L 51/04 (2006.01)

(52) U.S. Cl.
CPC .............. *C08L 67/04* (2013.01); *C08K 5/053* (2013.01); *C08L 51/04* (2013.01)

(58) Field of Classification Search
CPC ......... C08G 63/06; C08G 63/08; C08L 67/04; C08K 5/053
See application file for complete search history.

(56) References Cited

U.S. PATENT DOCUMENTS

| | | | | |
|---|---|---|---|---|
| 6,127,512 A | * | 10/2000 | Asrar | ............ C08K 3/22 528/271 |
| 2008/0033077 A1 | * | 2/2008 | Hashimoto | ............ C08L 51/04 524/9 |
| 2011/0293938 A1 | | 12/2011 | Takita et al. | |
| 2012/0316293 A1 | * | 12/2012 | Bouilloux | ............ B29C 47/385 525/190 |
| 2015/0166785 A1 | | 6/2015 | Minami et al. | |
| 2015/0210801 A1 | | 7/2015 | Abe et al. | |
| 2015/0252186 A1 | | 9/2015 | Suzuki et al. | |
| 2015/0291771 A1 | | 10/2015 | Suzuki et al. | |

FOREIGN PATENT DOCUMENTS

| | | |
|---|---|---|
| JP | 50 88169 | 7/1975 |
| JP | 61 141746 | 6/1986 |
| JP | 6 41376 | 2/1994 |
| JP | 2002 155207 | 5/2002 |
| JP | 2004 285258 | 10/2004 |
| JP | 2011 136428 | 7/2011 |
| WO | 2010 067543 | 6/2010 |

OTHER PUBLICATIONS

International Search Report Issued Feb. 18, 2014 in PCT/JP14/000188 Filed Jan. 16, 2014.
U.S. Appl. No. 14/761,811, filed Jul. 17, 2015, Suzuki, et, al.

\* cited by examiner

*Primary Examiner* — Robert Jones, Jr.
(74) *Attorney, Agent, or Firm* — Oblon, McClelland, Maier & Neustadt, L.L.P.

(57) ABSTRACT

Disclosed herein is an aliphatic polyester resin composition that simultaneously improves slow crystallization, low impact strength, and low tensile elongation that are the drawbacks of a polyhydroxyalkanoate.
The aliphatic polyester resin composition comprises: a polyhydroxyalkanoate (A); a graft copolymer (B); and pentaerythritol (C), wherein the graft copolymer (B) is obtained by graft polymerization of a vinyl-based monomer onto at least one rubber selected from the group consisting of a composite rubber (b1) comprising a polyorganosiloxane component and a polyalkyl(meth)acrylate component, an acrylic rubber (b2), and a diene-based rubber (b3) comprising a diene-based monomer.

9 Claims, No Drawings

POLYESTER RESIN COMPOSITION, AND MOLDED ARTICLE CONTAINING SAID RESIN COMPOSITION

TECHNICAL FIELD

The present invention relates to a polyester resin composition, and more particularly relates to a polyester resin composition that allows a biodegradable polyester resin degradable by the action of a microorganism to be applied to various industrial materials, and a molded article comprising such a polyester resin composition.

BACKGROUND ART

In recent years, biodegradable plastics have been actively developed as materials that can solve problems caused by plastic waste that places a heavy burden on the global environment, such as impact on the ecosystem, generation of harmful gases during combustion, and global warming due to a large amount of heat generated by combustion.

In particular, carbon dioxide generated by combustion of plant-derived biodegradable plastics was originally present in the air, and therefore the amount of carbon dioxide in the air does not increase. This is referred to as carbon neutral, and regarded as important under the Kyoto Protocol that sets carbon dioxide reduction targets. For this reason, biodegradable plastics have been expected to be actively used.

Recently, from the viewpoint of biodegradability and carbon neutral, aliphatic polyester resins, especially polyhydroxyalkanoate (hereinafter, sometimes referred to as PHA) resins have received attention as plant-derived plastics. Among PHA resins, for example, poly(3-hydroxybutyrate) homopolymer resins (hereinafter, sometimes referred to as P3HB), poly(3-hydroxybutyrate-co-3-hydroxyvalerate) copolymer resins (hereinafter, sometimes referred to as P3HB3HV), poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins (hereinafter, sometimes referred to as P3HB4HB), and polylactic acid (hereinafter, sometimes referred to as PLA) have received attention.

However, the PHA resins are originally poor in impact strength and tensile elongation, and therefore need to be improved.

Patent Literature 1 discloses a thermoplastic resin composition comprising a polylactic acid-based resin and a graft copolymer using a polyorganosiloxane/acrylic composite rubber containing a polyorganosiloxane and an alkyl(meth)acrylate rubber. However, the resin composition does not have sufficient impact strength.

Patent Literature 2 discloses that the melt strength of an aromatic polyester can be improved by adding a highly-dispersible high-molecular-weight vinyl aromatic copolymer. However, the obtained polyester resin composition is not preferred from the viewpoint of carbon neutral.

Patent Literature 3 discloses that the molding processability of a polyester, which is a thermoplastic polymer, in vacuum forming, pressure forming, or the like can be improved by blending with an acrylic compound. However, in Patent Literature 3, examples of the polyester do not include a polyhydroxyalkanoate that is a biodegradable aliphatic polyester-based resin.

Further, the PHA resins have a low crystallization speed, and therefore require a long cooling time for solidification after heat melting in molding processing, which causes a problem that productivity is poor.

Therefore, it has heretofore been proposed that an inorganic material, such as boron nitride, titanium oxide, talc, layered silicate, calcium carbonate, sodium chloride, or a metal phosphate, is blended with a PHA resin to improve crystallization. However, its effect is insufficient.

CITATION LIST

Patent Literatures

PTL 1: JP-A-2004-285258
PTL 2: JP-A-6-41376
PTL 3: JP-A-2002-155207
PTL 4: JP-A-2011-136428

SUMMARY OF INVENTION

Technical Problem

It is an object of the present invention to simultaneously improve slow crystallization, low impact strength, and low tensile elongation that are the drawbacks of a biodegradable polyester degraded into water and carbon dioxide by the action of a microorganism, especially a polyhydroxyalkanoate, to improve processability and processing speed in molding processing such as injection molding, etc. It is also an object of the present invention to impart toughness and ductility to a obtained molded article.

Solution to Problem

The present inventors have found that the processability, impact strength, and tensile elongation of a polyhydroxyalkanoate can be simultaneously improved by blending with a graft copolymer obtained by graft polymerization of a vinyl-based monomer onto a specific rubber and pentaerythritol. This finding has led to the completion of the present invention.

More specifically, the present invention is directed to an aliphatic polyester resin composition comprising: a polyhydroxyalkanoate (A); a graft copolymer (B); and pentaerythritol (C), wherein the graft copolymer (B) is obtained by graft polymerization of a vinyl-based monomer onto at least one rubber selected from the group consisting of a composite rubber (b1) comprising a polyorganosiloxane component and a polyalkyl(meth)acrylate component, an acrylic rubber (b2), and a diene-based rubber (b3) comprising a diene-based monomer.

It is preferred that the graft copolymer (B) is contained in an amount of 0.1 to 100 parts by weight with respect to 100 parts by weight of the polyhydroxyalkanoate (A).

It is also preferred that the vinyl-based monomer in the graft copolymer (B) comprises 70 to 100 wt % of at least one vinyl-based monomer selected from the group consisting of a vinyl cyanide monomer, an aromatic vinyl monomer, an acrylate, and a methacrylate and 30 to 0 wt % of another vinyl-based monomer copolymerizable therewith.

It is also preferred that the graft copolymer (B) is obtained by graft polymerization of the vinyl-based monomer onto the acrylic rubber (b2).

It is also preferred that a monomer constituting the acrylic rubber (b2) mainly comprises an acrylate, and the vinyl-based monomer contains an alkyl methacrylate.

It is also preferred that the diene-based rubber (b3) is obtained by copolymerization of 50 to 100 wt % of a diene-based monomer, 50 to 0 wt % of another monofunctional vinyl-based monomer copolymerizable with the diene-based monomer, and 0 to 5 wt % of a polyfunctional monomer having 2 or more non-conjugated double bonds in one molecule (wherein a total of the diene-based monomer, the another monofunctional vinyl-based monomer, and the polyfunctional monomer is 100 wt %), and that a weight ratio between the diene-based rubber (b3) and the vinyl-based monomer graft polymerized onto the diene-based rubber (b3) is diene-based rubber (b3)/vinyl-based monomer=15/85 to 90/10 (wt/wt).

It is also preferred that the pentaerythritol (C) is contained in an amount of 0.05 to 20 parts by weight with respect to 100 parts by weight of the polyhydroxyalkanoate (A).

It is also preferred that the polyhydroxyalkanoate (A) contains a repeating unit represented by the following general formula (1):

[—CHR—CH$_2$—CO—O—]     (1)

(wherein R is an alkyl group represented by $C_nH_{2n+1}$ and n is an integer of 1 or more but 15 or less).

It is also preferred that the polyhydroxyalkanoate (A) is one or more selected from poly(3-hydroxybutyrate) homopolymer resins, poly(3-hydroxybutyrate-co-3-hydroxyvalerate) copolymer resins, poly(3-hydroxybutyrate-co-3-hydroxyvalerate-co-3-hydroxyhexanoate) copolymer resins, poly(3-hydroxybutyrate-co-3-hydroxyhexanoate) copolymer resins, and poly(3-hydroxybutyrate-co-4-hydroxybutyrate) copolymer resins.

The present invention also relates to a polyester resin molded article obtained by molding the above aliphatic polyester resin composition.

Advantageous Effects of Invention

According to the present invention, it is possible to provide a resin composition that can simultaneously improve slow crystallization, low impact strength, and low tensile elongation of a polyhydroxyalkanoate to improve processability and processing speed in molding processing such as injection molding, etc., and it is also possible to impart toughness and ductility to a molded article obtained from the resin composition.

DESCRIPTION OF EMBODIMENTS

Hereinbelow, the present invention will be described in more detail.

A polyester resin composition according to the present invention contains PHA (A), a graft copolymer (B), and pentaerythritol (C).

The PHA (A) used in the present invention is an aliphatic polyester containing a repeating unit represented by a formula (1): [—CHR—CH$_2$—CO—O—] (wherein R is an alkyl group represented by $C_nH_{2n+1}$ and n is an integer of 1 or more but 15 or less).

The PHA is preferably a polymer resin comprising 80 mol % or more of 3-hydroxybutyrate, more preferably a polymer resin comprising 85 mol % or more of 3-hydroxybutyrate. The PHA is preferably produced by a microorganism. Specific examples of the PHA include
poly(3-hydroxybutyrate) homopolymer resins, poly(3-hydroxybutyrate-co-3-hydroxypropionate) copolymer resins, poly(3-hydroxybutyrate-co-3-hydroxyvalerate) copolymer resins,
poly(3-hydroxybutyrate-co-3-hydroxyvalerate-co-3-hydroxyhexanoate) copolymer resins,
poly(3-hydroxybutyrate-co-3-hydroxyhexanoate) copolymer resins,
poly(3-hydroxybutyrate-co-3-hydroxyheptanoate) copolymer resins,
poly(3-hydroxybutyrate-co-3-hydroxyoctanoate) copolymer resins,
poly(3-hydroxybutyrate-co-3-hydroxynonanoate) copolymer resins,
poly(3-hydroxybutyrate-co-3-hydroxydecanoate) copolymer resins,
poly(3-hydroxybutyrate-co-3-hydroxyundecanoate) copolymer resins, and
poly(3-hydroxybutyrate-co-4-hydroxybutyrate) copolymer resins. In particular, from the viewpoint of molding processability and molded article physical properties, poly(3-hydroxybutyrate) homopolymer resins, poly(3-hydroxybutyrate-co-3-hydroxyvalerate) copolymer resins,
poly(3-hydroxybutyrate-co-3-hydroxyvalerate-co-3-hydroxyhexanoate) copolymer resins,
poly(3-hydroxybutyrate-co-3-hydroxyhexanoate) copolymer resins, and
poly(3-hydroxybutyrate-co-4-hydroxybutyrate) copolymer resins can be suitably used.

From the viewpoint of molding processability, molded article quality, etc., the ratio between 3-hydroxybutyrate (hereinafter, sometimes referred to as 3HB) and a comonomer copolymerized therewith (e.g., 3-hydroxyvalerate (hereinafter, sometimes referred to as 3HV), 3-hydroxyhexanoate (hereinafter, sometimes referred to as 3HH), 4-hydroxybutyrate (hereinafter, sometimes referred to as 4HB)) constituting the PHA, that is, the ratio between monomers in the copolymer resin is preferably 3-hydroxybutyrate/comonomer=97/3 to 80/20 (mol %/mol %), more preferably 95/5 to 85/15 (mol %/mol %). If the ratio of the comonomer is less than 3 mol %, there is a possibility where a molding processing temperature is close to a pyrolysis temperature so that molding processing is difficult. If the ratio of the comonomer exceeds 20 mol %, there is a possibility where the PHA is slowly crystallized so that productivity is poor. The comonomers may be used singly or in combination of two or more of them. Even when the comonomers are used in combination of two or more of them, a preferred range of the ratio between monomers (3-hydroxybutyrate/comonomer) in the copolymer resin is the same as described above.

The ratio between individual monomers in the copolymer resin as the PHA can be measured by gas chromatography in the following manner. Two milliliters of a mixed solution of sulfuric acid/methanol (15/85 (weight ratio)) and 2 mL of chloroform are added to about 20 mg of the dry PHA, and the obtained mixture is hermetically sealed and heated at 100° C. for 140 minutes to obtain a methyl ester of a PHA degradation product. After cooling, 1.5 g of sodium hydrogen carbonate is added thereto little by little for neutralization, and the obtained mixture is allowed to stand until the generation of carbon dioxide is stopped. Then, 4 mL of diisopropyl ether is added to and well mixed with the mixture, and then the monomer unit composition of the PHA degradation product in a supernatant is analyzed by capillary gas chromatography to determine the ratio between individual monomers in the copolymer resin.

The gas chromatography is performed using a gas chromatograph "GC-17A" manufactured by SHIMADZU CORPORATION and a capillary column "NEUTRA BOND-1" (column length: 25 m, column inner diameter: 0.25 mm, liquid film thickness: 0.4 μm) manufactured by GL Sciences Inc. Helium gas is used as a carrier gas, a column inlet pressure is 100 kPa, and the amount of a sample injected is 1 μL. Temperature conditions are as follows: temperature rise is performed at a rate of 8° C./min from an initial temperature of 100° C. to 200° C., and temperature rise is further performed at a rate of 30° C./min from 200 to 290° C.

The weight-average molecular weight (hereinafter, sometimes referred to as Mw) of the PHA used in the present invention is preferably 200000 to 2500000, more preferably 250000 to 2000000, even more preferably 300000 to 1000000. If the weight-average molecular weight is less than 200000, there is a possibility where mechanical properties etc. are poor. If the weight-average molecular weight exceeds 2500000, there is a possibility where molding processing is difficult.

The weight-average molecular weight is measured by gel permeation chromatography using a gel permeation chromatograph ("Shodex GPC-101" manufactured by Showa Denko K.K.), a polystyrene gel column ("Shodex K-804" manufactured by Showa Denko K.K.), and chloroform as a mobile phase. The weight-average molecular weight can be determined as a molecular weight based on polystyrene standards. In this case, a calibration curve is prepared using polystyrene standards with weight-average molecular weights of 31400, 197000, 668000, and 1920000.

It is to be noted that the PHA is produced by, for example, a microorganism such as *Alcaligenes eutrophus* AC32 strain obtained by introducing a PHA synthetase gene derived from *Aeromonas caviae* into *Alcaligenes eutrophus* (International Deposit under Budapest Treaty, International Depository Authority: National Institute of Technology and Evaluation Patent Microorganisms Depositary (6 Chuo, 1-1-1, Higashi, Tsukuba, Ibaraki, Japan), Date of Original Deposit: Aug. 12, 1996, transferred on Aug. 7, 1997, Deposit Number: FERM BP-6038 (transferred from original deposit FERM P-15786)) (J. Bacteriol., 179, 4821 (1997)).

The graft copolymer (B) used in the present invention is obtained by graft polymerization of a vinyl-based monomer onto at least one rubber selected from the group consisting of a composite rubber (b1) comprising a polyorganosiloxane component and a polyalkyl(meth)acrylate component, an acrylic rubber (b2), and a diene-based rubber (b3) comprising a diene-based monomer. In the present invention, the impact strength and tensile elongation of the polyhydroxyalkanoate (A) can be improved by blending with the graft copolymer (B).

First, a composite rubber-based graft copolymer (hereinafter, also referred to as "graft copolymer (B1)") will be described which is obtained by graft polymerization of a vinyl-based monomer onto a composite rubber (b1) comprising a polyorganosiloxane component and a polyalkyl (meth)acrylate component.

The polyorganosiloxane component constituting the composite rubber (b1) is a component forming the main structure of a silicone rubber chain, and a linear or cyclic organosiloxane may be used as its monomer. Among them, a cyclic organosiloxane is preferred from the viewpoint of applicability to an emulsion polymerization system and economy. Specific examples of the cyclic organosiloxane include 6- to 12-membered cyclic organosiloxanes such as hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. They may be used singly or in combination of two or more of them.

The polyorganosiloxane component may also be obtained by copolymerization of the organosiloxane with a cross-linking agent, a graft-linking agent, and another organosilane that are optionally used.

The cross-linking agent is a component that is copolymerized with the organosiloxane to introduce a cross-linked structure into the silicone rubber to develop rubber elasticity. Specific examples of the cross-linking agent include tetra- or tri-functional silane compounds such as tetramethoxysilane, tetraethoxysilane, triethoxymethylsilane, triethoxyethylsilane, butyltrimethoxysilane, propyltrimethoxysilane, and octyltrimethoxysilane. They may be used singly or in combination of two or more of them.

The graft-linking agent is, for example, a reactive silane compound having a polymerizable unsaturated bond or a mercapto group in its molecule or an organosiloxane having a polymerizable unsaturated bond or a mercapto group in its molecule. The graft-linking agent is a component that is copolymerized with the organosiloxane or the cross-linking agent to introduce a polymerizable unsaturated bond or a mercapto group into the side chain and(or) terminal of the copolymer. The polymerizable unsaturated bond or the mercapto group functions as a grafting active site where the vinyl-based monomer used in the present invention is to be graft copolymerized. Further, the polymerizable unsaturated bond or the mercapto group also functions as a cross-linking site when a radical reaction is performed using a radical polymerization initiator. It is to be noted that even when cross-linking is performed by a radical reaction, some polymerizable unsaturated bonds or mercapto groups remain as grafting active site, and therefore grafting is possible.

Specific examples of the reactive silane compound having a polymerizable unsaturated bond in its molecule include β-methacryloyloxyethyldimethoxymethylsilane, γ-methacryloyloxypropyldimethoxymethylsilane, γ-methacryloyloxypropyltrimethoxysilane, γ-methacryloyloxypropyldimethylmethoxysilane, γ-methacryloyloxypropyltriethoxysilane, γ-methacryloyloxypropyldiethoxymethylsilane, γ-methacryloyloxypropyltripropoxysilane, γ-methacryloyloxypropyldipropoxymethylsilane, p-vinylphenyldimethoxymethylsilane, p-vinylphenyltrimethoxysilane, p-vinylphenyltriethoxysilane, p-vinylphenyldiethoxymethylsilane, vinylmethyldimethoxysilane, vinylmethyldiethoxysilane, vinyltrimethoxysilane, vinyltriethoxysilane, allylmethyldimethoxysilane, allylmethyldiethoxysilane, allyltrimethoxysilane, and allyltriethoxysilane, etc.

Examples of the reactive silane compound having a mercapto group in its molecule include mercaptopropyltrimethoxysilane and mercaptopropyldimethoxymethylsilane, etc.

These organosiloxane, cross-linking agent, graft-linking agent, and another organosilane are preferably used so that when the total of them is 100 wt %, the organosiloxane content of the polyorganosiloxane component is usually 70 to 99.9 wt %, preferably 85 to 99.5 wt %, the cross-linking agent content of the polyorganosiloxane component is usually 0 to 10 wt %, preferably 0 to 5 wt %, the graft-linking agent content of the polyorganosiloxane component is usually 0 to 10 wt %, preferably 0.3 to 5 wt %, and the another organosilane content of the polyorganosiloxane component is usually 0 to 10 wt %, preferably 0 to 5 wt %. It is to be noted that there is no case where both the cross-linking agent content and the graft-linking agent content are 0%, and one of the cross-linking agent and the graft-linking agent is preferably used in an amount of 0.1 wt % or more. If the organosiloxane content is less than 70 wt %, the effect of improving impact strength tends to be reduced for the lack of rubber-like properties. On the other hand, if the organosiloxane content exceeds 99.9 wt %, the amounts of the cross-linking agent, the graft-linking agent, and the another organosilane are too low, and therefore the effect of using them is less likely to be observed. If the cross-linking agent content or the graft-linking agent content is extremely low, the effect of improving impact strength tends to be reduced. On the other hand, even if the cross-liking agent content or the graft-linking agent content is extremely high, the effect of improving impact strength tends to be reduced for the lack of rubber-like properties.

The organosiloxane is preferably in the form of rubber latex. A silicone rubber latex containing the polyorganosiloxane component can be produced by a method in which a mixture of the organosiloxane and the cross-linking agent, the graft-linking agent, and the organosilane other than them, which are optionally used, is emulsified and dispersed in water by mechanical shearing in the presence of an emulsifier and subjected to polymerization under an acidic condition. The silicone rubber obtained after the polymerization preferably has an average particle diameter in the range of 20 to 600 nm.

The emulsifier used in a latex of the organosiloxane should not lose activity as an emulsifier even in an acidic condition. Examples of such an emulsifier include alkylbenzene sulfonic acid, sodium alkylbenzene sulfonate, alkyl sulfonic acid, sodium alkyl sulfonate, sodium (di)alkyl sulfosuccinate, sodium polyoxyethylenenonylphenyl ether sulfonate, and sodium alkyl sulfate. They may be used singly or in combination of two or more of them. The pH of the acidic condition is preferably adjusted to 1.0 to 3.0 by adding an inorganic acid such as sulfuric acid or hydrochloric acid or an organic acid such as alkylbenzene sulfonic acid, alkyl sulfonic acid, or trifluoroacetic acid to the system.

The temperature at which the polymerization is performed to produce a silicone rubber latex containing the polyorganosiloxane component is preferably 60 to 120° C., more preferably 70 to 100° C. from the viewpoint of achieving an appropriate polymerization rate.

The polyalkyl(meth)acrylate component constituting the composite rubber (b1) in the graft copolymer (B1) used in the present invention is a polymer obtained by polymerization of a monomer component mainly containing an alkyl (meth)acrylate monomer. The polyalkyl(meth)acrylate component may be a polymer obtained by copolymerization of a monomer mixture mainly containing an alkyl (meth) acrylate monomer and optionally containing a polyfunctional monomer containing 2 or more polymerizable unsaturated bonds in its molecule, another copolymerizable monomer, etc. A polymerization method for obtaining the poly[alky(meth)acrylate] is not particularly limited, and an example of such a polymerization method includes a common emulsion polymerization method using a radical polymerization initiator and optionally a chain transfer agent (e.g., a method described in JP-A-50-88169 or JP-A-61-141746).

The alkyl (meth)acrylate monomer is a component forming the main structure of the polyalkyl(meth)acrylate component. Specific examples of the alkyl (meth)acrylate monomer include: alkyl acrylates having a C1 to C12 alkyl group such as methyl acrylate, ethyl acrylate, propyl acrylate, butyl acrylate, and 2-ethylhexyl acrylate, etc.; and alkyl methacrylate having a C4 to C12 alkyl group such as 2-ethylhexyl methacrylate and lauryl methacrylate, etc. These monomers may be used singly or in combination of two or more of them. From the viewpoint of a low glass transition temperature of the obtained polymer and economy, the alkyl (meth) acrylate monomer component preferably contains 40 to 100 wt % of butyl acrylate, more preferably 60 to 100 wt % of butyl acrylate. In this case, as a copolymer component other than butyl acrylate, for example, methyl acrylate, ethyl acrylate, or 2-ethylhexyl acrylate, etc. may be contained.

The polyfunctional monomer containing 2 or more polymerizable unsaturated bonds in its molecule is a component used to introduce a cross-linked structure into particles of the polyalkyl(meth)acrylate component to form a network structure and observe rubber elasticity, and to provide grafting active sites where the vinyl-based monomer is to be graft polymerized. Specific examples of the polyfunctional monomer include diallyl phthalate, triallyl cyanurate, triallyl isocyanurate, allyl methacrylate, allyl acrylate, ethylene glycol dimethacrylate, diethylene glycol dimethacrylate, triethylene glycol dimethacrylate, propylene glycol dimethacrylate, 1,3-butylene glycol dimethacrylate, 1,4-butylene glycol dimethacrylate, and divinyl benzene. They may be used singly or in combination of two or more of them. Among them, allyl methacrylate, triallyl cyanurate, and triallyl isocyanurate are preferred from the viewpoint of excellent cross-linking efficiency and grafting efficiency.

In the production of the polyalkyl(meth)acrylate component in the composite rubber (b1), the ratio of the alkyl (meth)acrylate monomer used is preferably 66.5 to 99.9 wt %, more preferably 85 to 99.9 wt % with respect to 100 wt % of the total amount of the alkyl (meth)acrylate monomer, the polyfunctional monomer containing 2 or more polymerizable unsaturated bonds in its molecule, and the another copolymerizable monomer. Further, the ratio of the polyfunctional monomer containing 2 or more polymerizable unsaturated bonds in its molecule used is preferably 0.1 to 10 wt %, more preferably 0.1 to 5 wt %. Further, the ratio of the another copolymerizable monomer used is preferably 0 to 20 wt %, more preferably 0 to 5 wt %. It is to be noted that these components are used so that the total of them is 100 wt %.

If the ratio of the alkyl (meth)acrylate monomer used is less than 66.5 wt %, there is a possibility that the effect of improving impact strength is reduced for the lack of rubber-like properties. If the ratio of the alkyl (meth)acrylate monomer used exceeds 99.9 wt %, the ratio of the polyfunctional monomer containing 2 or more polymerizable unsaturated bonds in its molecule is too low, and therefore the effect of using the polyfunctional monomer tends not to be sufficiently observed.

Further, if the ratio of the polyfunctional monomer containing 2 or more polymerizable unsaturated bonds in its molecule used is less than 0.1 wt %, there is a possibility that the effect of improving impact strength is reduced due to too low a cross-linking density. On the other hand, if the ratio of the polyfunctional monomer used exceeds 10 wt %, impact strength also tends to be reduced after all due to too high a cross-linking density It is to be noted that the another copolymerizable monomer is a component used to adjust refractive index or impact strength, and can be optionally added to achieve desired physical properties. Examples of the another copolymerizable monomer include methyl methacrylate, ethyl methacrylate, propyl methacrylate, glycidyl methacrylate, glycidyl acrylate, hydroxyethyl methacrylate, benzyl methacrylate, methacrylic acid, acrylic acid, styrene, substituted styrene, and acrylonitrile, etc.

The composite rubber (b1) comprising the polyorganosiloxane component and the polyalkyl(meth)acrylate component can be obtained by, for example, seed polymerization of a monomer mixture for the polyalkyl(meth)acrylate component in the presence of a silicone rubber latex containing the polyorganosiloxane. To the contrary, the composite rubber (b1) may be obtained by polymerization of a component used to produce the silicone rubber latex, which is added directly or in the form of emulsion, in the presence of a rubber latex of the polyalkyl(meth)acrylate component. Alternatively, the composite rubber (b1) may be obtained by mixing a rubber latex of the polyorganosiloxane component and a rubber latex of the polyalkyl(meth)acrylate component to obtain a mixed latex and then adding 0.1 to 15 parts by weight (solid) of an acid group-containing copolymer latex, prepared by copolymerization of 1 to 30 wt % of an unsaturated acid monomer, 35 to 99 wt % of a (meth) acrylate monomer, and 0 to 35 wt % of another monomer copolymerizable with them, with respect to 100 parts by weight (solid) of the mixed latex to achieve size enlargement by agglomeration.

The ratio between the polyorganosiloxane component and the polyalkyl(meth)acrylate component used is preferably polyorganosiloxane component/polyalkyl(meth)acrylate component=5/95 to 90/10, more preferably 10/90 to 50/50 in terms of weight ratio. If the ratio is less than 5/95, the amount of the alkyl (meth)acrylate component is large so that impact strength tends to be reduced. If the ratio exceeds 90/10, a polymerization conversion rate is significantly reduced, and therefore a large amount of the unreacted organosiloxane remains so that production efficiency tends to be reduced.

The average particle diameter of the composite rubber (b1) used in the present invention is preferably 0.02 to 1.1 μm, more preferably 0.03 to 1 μm from the viewpoint of improving impact strength. It is to be noted that the average particle diameter of the composite rubber used in the present invention is the average diameter of 50 particles measured from a transmission electron micrograph.

The gel content of the composite rubber (b1) used in the present invention is preferably 70% or more, more preferably 80% or more from the viewpoint of improving impact strength.

In the present invention, the gel content is measured in the following manner. First, part of the rubber latex is subjected to salting out, coagulation, separation, washing, and drying at 40° C. for 15 hours to obtain rubber crumbs. The crumbs are immersed in toluene for 8 hours while stirred at room temperature, and then centrifuged at 12000 rpm for 60 minutes. Then, the dry weight fraction of toluene insoluble matter is measured, and its value is defined as a gel content.

The vinyl-based monomer graft polymerized onto the composite rubber (b1) in the graft copolymer (B1) is not particularly limited. Preferred specific examples of the vinyl-based monomer include: vinyl cyanide monomers such as acrylonitrile and methacrylonitrile, etc.; aromatic vinyl monomers such as styrene, α-methylstyrene, and paramethylstyrene, etc.; acrylates such as methyl acrylate, butyl acrylate, 2-ethylhexyl acrylate, glycidyl acrylate, and hydroxyethyl acrylate, etc.; and methacrylates such as methyl methacrylate, ethyl methacrylate, butyl methacrylate, glycidyl methacrylate, and hydroxyethyl methacrylate, etc. They may be used singly or in combination of two or more of them.

The vinyl-based monomer used in the graft copolymer (B1) preferably comprises 70 to 100 wt % of at least one vinyl-based monomer selected from the group consisting of a vinyl cyanide monomer, an aromatic vinyl monomer, an acrylate, and a methacrylate and 30 to 0 wt % of another vinyl-based monomer copolymerizable therewith. Examples of the another vinyl-based monomer include maleic anhydride, phenyl maleimide, methacrylic acid, and acrylic acid, etc. They may be used singly or in combination of two or more of them. The vinyl-based monomer more preferably comprises 10 to 100 wt % of an alkyl methacrylate monomer, 0 to 60 wt % of an alkyl acrylate monomer, 0 to 90 wt % of an aromatic vinyl monomer, 0 to 40 wt % of a vinyl cyanide monomer, and 0 to 20 wt % of another vinyl monomer copolymerizable therewith, wherein the total amount of them is 100 wt %.

When the vinyl-based monomer is graft polymerized onto the composite rubber (b1), the addition and polymerization of the vinyl-based monomer component is not particularly limited, and may be performed in one step or multiple steps. The addition of the monomer component is not particularly limited, and the monomer component may be added all at once, added continuously, or added by a combination of them in two or more divided steps.

The ratio between the composite rubber (b1) and the vinyl-based monomer used in the present invention is preferably composite rubber (b1)/vinyl-based monomer=5/95 to 95/5, more preferably 50/50 to 90/10 in terms of weight ratio. If the ratio is less than 5/95, sufficient impact strength tends not to be observed due to too low a rubber component content. If the ratio exceeds 95/5, the amount of the monomer to be grafted is small, and therefore when the obtained graft copolymer (B1) is blended with the polyhydroxyalkanoate (A), miscibility with the polyhydroxyalkanoate (A) as a matrix resin is poor so that impact strength tends to be reduced after all.

The graft polymerization can be performed by a common emulsion polymerization method. In the polymerization, a common radical polymerization initiator or chain transfer agent can be used.

Further, a so-called free polymer obtained by polymerization of the vinyl-based monomer in another polymerization machine may be added to the graft copolymer. It is to be noted that the composition of the graft and the composition of the free polymer may be the same or different. However, when different, the composition of the graft and the composition of the free polymer are preferably miscible with each other from the viewpoint of physical properties.

When the composite rubber-based graft copolymer (graft copolymer (B1)) after the polymerization is blended with the polyhydroxyalkanoate, the polymer separated from an emulsion may be used or the emulsion may be directly used. As a method for separating the polymer, for example, a common method can be used in which the emulsion is coagulated by adding a metal salt such as calcium chloride, magnesium chloride, or magnesium sulfate to separate the polymer, and the polymer is washed with water, dehydrated, and dried. Alternatively, a spray drying method may also be used.

Hereinbelow, a graft copolymer (hereinafter, also referred to as "graft copolymer (B2)") will be described which is obtained by graft polymerization of a vinyl-based monomer onto an acrylic rubber (b2).

The structure of the graft copolymer (B2) is not particularly limited as long as the graft copolymer (B2) is a graft copolymer obtained by graft polymerization of a vinyl-based monomer onto an acrylic rubber (b2). However, the graft copolymer (B2) is preferably a core-shell-type graft copolymer having an acrylic rubber (b2) as a core layer and a layer comprising a vinyl-based monomer as a shell layer.

In the core-shell-type graft copolymer, the acrylic rubber (b2) forming the core layer may have a layer structure having only one layer or a multi-layer structure having two or more layers. Similarly, a polymer forming the shell layer may have a layer structure having only one layer or a multi-layer structure having two or more layers. Usually, a core-shell-type graft copolymer is obtained by graft copolymerization of a rubber-like polymer with a monomer mixture, and is, in many cases, obtained by graft polymerization of a monomer mixture in the presence of a rubber latex containing a rubber-like polymer as a solid.

A monomer constituting the acrylic rubber (b2) preferably mainly comprises an acrylate. In particular, the acrylic rubber (b2) preferably mainly comprises an alkyl acrylate monomer. When the total weight of monomers constituting the acrylic rubber (b2) is 100 wt %, the acrylic rubber (b2) is particularly preferably a polymer obtained by polymerization of a monomer mixture comprising 50 to 100 wt % of an alkyl acrylate monomer. If necessary, the monomer mixture may contain, as another component, 0 to 50 wt % of a monomer selected from the group consisting of an aromatic vinyl monomer and a vinyl monomer copolymerizable with the alkyl acrylate monomer and/or the aromatic vinyl monomer. Further, if necessary, the monomer mixture may contain 0 to 5 wt % of a polyfunctional monomer containing 2 or more polymerizable unsaturated bonds in its molecule. An acrylic rubber-containing rubber latex can be obtained by, for example, emulsion polymerization of a mixture of these monomers. When the acrylic rubber is obtained by emulsion polymerization, a rubber latex in which the acrylic rubber is dispersed in an aqueous medium can be directly used for graft copolymerization with a vinyl-based monomer.

Specific examples of the alkyl acrylate monomer include, but are not limited to, alkyl acrylates having a C1 to C8 alkyl group such as methyl acrylate, ethyl acrylate, butyl acrylate, and 2-ethylhexyl acrylate, etc. They may be used singly or in combination of two or more of them.

The amount of the alkyl acrylate monomer used in the acrylic rubber (b2) is preferably 50 to 100 wt %, more preferably 60 to 95 wt %, even more preferably 65 to 95 wt % when the total weight of monomers constituting the acrylic rubber (b2) is 100 wt %. If the amount of the alkyl acrylate monomer used is less than 50 wt %, there is a possibility where the impact strength of a finally-obtained molded article is not sufficiently improved.

The aromatic vinyl monomer that may be optionally contained as a monomer constituting the acrylic rubber (b2) is a component that has the function of improving the transparency of a molded article finally obtained from the polyester resin composition according to the present invention and that adjusts the refractive index of the graft copolymer (B2) to reduce a difference in refractive index between the graft copolymer (B2) and the polyhydroxyalkanoate (A). Specific examples of the aromatic vinyl monomer include, but are not limited to, styrene, α-methyl styrene, 1-vinyl naphthalene, and 2-vinyl naphthalene, etc. However, the aromatic vinyl monomer may or may not be used for the adjustment of refractive index.

The amount of the aromatic vinyl monomer used in the acrylic rubber (b2) may be in the range of 0 to 50 wt % when the total weight of monomers constituting the acrylic rubber (b2) is 100 wt %. If the amount of the aromatic vinyl monomer exceeds 50 wt %, the amount of the alkyl acrylate monomer used is relatively small so that the obtained acrylic rubber (b2) is less likely to observe excellent impact strength. However, when importance is given to impact strength, the amount of the aromatic vinyl monomer is preferably 0 to 25 wt %, more preferably 0 wt %.

It is to be noted that from the viewpoint of increasing transparency, the difference in refractive index between the polyhydroxyalkanoate (A) used in the present invention and the graft copolymer (B2) obtained by graft polymerization of a vinyl-based monomer onto an acrylic rubber (b2) is preferably 0.02 or less, more preferably 0.017 or less.

The vinyl monomer copolymerizable with the alkyl acrylate monomer and/or the aromatic vinyl monomer, which may be optionally contained as a monomer constituting the acrylic rubber (b2), is a component for finely adjusting miscibility between the graft copolymer (B2) and the polyhydroxyalkanoate (A). Specific examples of such a copolymerizable vinyl monomer include, but are not limited to, alkyl methacrylates having a C1 to C20 alkyl group such as methyl methacrylate, ethyl methacrylate, and butyl methacrylate, etc., vinyl cyanide monomers such as acrylonitrile and methacrylonitrile; and 4-hydroxybutyl acrylate, etc.

The amount of the vinyl monomer copolymerizable with the alkyl acrylate monomer and/or the aromatic vinyl monomer used in the acrylic rubber (b2) may be in the range of 0 to 50 wt % when the total weight of monomers constituting the acrylic rubber (b2) is 100 wt %. The amount of the vinyl monomer copolymerizable with the alkyl acrylate monomer and/or the aromatic vinyl monomer is preferably 0 to 10 wt %, more preferably 0 wt %. If the amount of the vinyl monomer copolymerizable with the alkyl acrylate monomer and/or the aromatic vinyl monomer exceeds 50 wt %, there is a possibility where the amount of the alkyl acrylate monomer used is relatively small so that the obtained acrylic rubber (b2) is less likely to observe excellent impact strength.

The polyfunctional monomer that may be optionally contained as a monomer constituting the acrylic rubber (b2) is a component for forming a cross-linked structure in the obtained acrylic rubber (b2). Specific examples of the polyfunctional monomer include, but are not limited to, divinyl benzene, allyl acrylate, allyl methacrylate, diallyl phthalate, triallyl cyanurate, triallyl isocyanurate, a diacrylate-based compound, and a dimethacrylate-based compound, etc. Another example of the polyfunctional monomer that can be used includes a molecule called macromer, that is, a molecule having radical polymerizable functional groups at its both terminals, such as α,ω-dimethacryloyloxy polyoxyethylene, etc.

The amount of the polyfunctional monomer used may be in the range of 0 to 5 wt % when the total weight of monomers constituting the acrylic rubber (b2) is 100 wt %. The amount of the polyfunctional monomer is preferably 0.1 to 3 wt %. If the amount of the polyfunctional monomer exceeds 5 wt %, the amount of the alkyl acrylate monomer used is relatively small, which is undesirable because the obtained acrylic rubber (b2) is less likely to observe excellent impact strength.

A method for obtaining the acrylic rubber (b2) used in the present invention is not particularly limited. For example, a method can be used in which a monomer mixture containing desired amounts of the alkyl acrylate monomer, the aromatic vinyl monomer, the vinyl monomer copolymerizable with them, and the polyfunctional monomer is blended with an aqueous medium, a polymerization initiator, an emulsifier, etc. and polymerized by, for example, a common emulsion polymerization method to obtain a rubber latex containing the acrylic rubber (b2).

The addition and polymerization of the monomer mixture to obtain the acrylic rubber (b2) is not particularly limited and may be performed in one step or multiple steps. The addition of the monomer mixture is not particularly limited, and the monomer mixture may be added all at once, added continuously, or added by a combination of them in two or more divided steps.

The monomer mixture may also be obtained in the form of micelle by individually introducing the alkyl acrylate monomer, the aromatic vinyl monomer, the vinyl monomer copolymerizable with them, and the polyfunctional monomer or individually introducing combinations of some of them into a reaction container containing an aqueous medium, an initiator, an emulsifier, etc. previously introduced thereinto, and then mixing the obtained mixture with stirring in the reaction container. In this case, a rubber latex containing the acrylic rubber (b2) can be obtained by changing the conditions in the reaction container so that polymerization can be initiated to polymerize the monomer mixture by, for example, a common emulsion polymerization method.

The glass transition temperature of the thus obtained acrylic rubber (b2) is preferably 0° C. or lower, more preferably −30° C. or lower. If the glass transition temperature of the acrylic rubber (b2) exceeds 0° C., there is a possibility where a finally-obtained molded article cannot absorb an impact when a great deformation velocity is applied thereto.

The vinyl-based monomer graft polymerized onto the acrylic rubber (b2) in the graft copolymer (B2), especially the vinyl-based monomer constituting the shell layer of the core-shell-type graft copolymer is not particularly limited, but preferably comprises 70 to 100 wt % of at least one vinyl-based monomer selected from the group consisting of a vinyl cyanide monomer, an aromatic vinyl monomer, an acrylate, and a methacrylate and 0 to 30 wt % of another vinyl-based monomer copolymerizable with the vinyl-based monomer. The vinyl-based monomer more preferably comprises 10 to 100 wt % of an alkyl methacrylate monomer, 0 to 60 wt % of an alkyl acrylate monomer, 0 to 90 wt % of an aromatic vinyl monomer, 0 to 40 wt % of a vinyl cyanide monomer, and 0 to 20 wt % of another vinyl monomer copolymerizable with the vinyl-based monomer, wherein the total amount of them is 100 wt %.

The alkyl methacrylate monomer is a preferred component for improving adhesion between the graft copolymer and the polyhydroxyalkanoate to improve the impact strength of a finally-obtained molded article according to the present invention. Specific examples of the alkyl methacrylate monomer include, but are not limited to, alkyl methacrylates having a C1 to C5 alkyl group such as methyl methacrylate, ethyl methacrylate, and butyl methacrylate, etc.

When the total weight of the vinyl-based monomer is 100 wt %, the amount of the alkyl methacrylate monomer that can be used is preferably in the range of 10 to 100 wt %, more preferably 20 to 100 wt %, even more preferably 30 to 100 wt %. If the amount of the alkyl methacrylate monomer is less than 10 wt %, there is a possibility where the impact strength of a finally-obtained molded article cannot be sufficiently improved. Further, the alkyl methacrylate monomer preferably contains 60 to 100 wt % of methyl methacrylate, more preferably contains 80 to 100 wt % of methyl methacrylate, which makes it possible to improve the impact strength of a finally-obtained molded article.

The alkyl acrylate monomer is a component that adjusts the softening temperature of the shell layer of the core-shell-type graft copolymer to improve well dispersion of the graft copolymer (B2) in the polyhydroxyalkanoate in a finally-obtained molded article to improve the impact strength of the molded article. Specific examples of the alkyl acrylate monomer include, but are not limited to, alkyl acrylates having a C2 to C12 alkyl group such as methyl acrylate, ethyl acrylate, butyl acrylate, and 2-ethylhexyl acrylate, etc.

When the total weight of the vinyl-based monomer is 100 wt %, the amount of the alkyl acrylate monomer that can be used is in the range of 0 to 60 wt %, preferably 0 to 50 wt %, more preferably 0 to 40 wt %. If the amount of the alkyl acrylate monomer exceeds 60 wt %, the amount of the alkyl methacrylate monomer used is relatively small, and therefore there is a possibility where the impact strength of a finally-obtained molded article is not sufficiently improved.

The aromatic vinyl monomer is a component that has the function of improving the transparency of a finally-obtained molded article and that adjusts the refractive index of the graft copolymer (B2) to reduce a difference in refractive index between the graft copolymer (B2) and the polyhydroxyalkanoate. Specific examples of the aromatic vinyl monomer include, but are not limited to, the monomers exemplified above as specific examples of the aromatic vinyl monomer, etc.

When the total weight of the vinyl-based monomer is 100 wt %, the amount of the aromatic vinyl monomer that can be used is in the range of 0 to 90 wt %, preferably 0 to 50 wt %, more preferably 0 to 30 wt %. If the amount of the aromatic vinyl monomer exceeds 90 wt %, the amount of the alkyl methacrylate monomer used is relatively small, and therefore there is a possibility where the impact strength of a finally-obtained molded article cannot be sufficiently improved.

The vinyl cyanide monomer is a component for finely adjusting miscibility between the graft copolymer and the polyhydroxyalkanoate. Specific examples of the vinyl cyanide monomer include, but are not limited to, acrylonitrile and methacrylonitrile, etc. They may be used singly or in combination of two or more of them.

When the total weight of the vinyl-based monomer is 100 wt %, the amount of the vinyl cyanide monomer that can be used is in the range of 0 to 40 wt %, more preferably 0 wt %. If the amount of the vinyl cyanide monomer exceeds 40 wt %, the amount of the alkyl methacrylate monomer used is relatively small, and therefore there is a possibility where the impact strength of a finally-obtained molded article is not sufficiently improved.

The another copolymerizable vinyl monomer is a component for improving miscibility with the polyhydroxyalkanoate or improving processability during molding. Specific examples of the another copolymerizable vinyl monomer include, but are not limited to, hydroxyethyl methacrylate, hydroxyethyl acrylate, 4-hydroxybutyl acrylate, glycidyl methacrylate, glycidyl acrylate, maleic anhydride, phenyl maleimide, methacrylic acid, and acrylic acid, etc.

When the total weight of the vinyl-based monomer is 100 wt %, the amount of the another copolymerizable vinyl monomer that can be used is in the range of 0 to 20 wt %, preferably 0 to 10 wt %, more preferably 0 wt %. If the amount of the another copolymerizable vinyl monomer exceeds 20 wt %, the amount of the alkyl methacrylate monomer used is relatively small, and therefore there is a possibility where the impact strength of a finally-obtained molded article is not sufficiently improved.

The core-shell-type graft copolymer is obtained by graft copolymerization of the acrylic rubber (b2) with a monomer mixture containing the vinyl-based monomer. The monomer mixture provides the shell layer of the core-shell-type graft copolymer as a result of graft copolymerization.

The ratio between the acrylic rubber (b2) constituting the core layer and the vinyl-based polymer as the shell layer in the core-shell-type graft copolymer is 5 to 95 parts by weight of the acrylic rubber (b2) and 95 to 5 parts by weight of the shell-layer polymer, preferably 50 to 95 parts by weight of the acrylic rubber (b2) and 50 to 5 parts by weight of the shell layer polymer. It is not preferred that the amount of the acrylic rubber (b2) is less than 5 parts by weight and the amount of the shell-layer polymer exceeds 95 parts by weight, because the impact strength of a finally-obtained molded article cannot be sufficiently improved. Further, if the amount of the acrylic rubber (b2) exceeds 95 parts by weight and the amount of the shell layer polymer is less than 5 parts by weight, there is a possibility where the impact strength and transparency of a finally-obtained molded article according to the present invention are not sufficiently improved due to the loss of adhesion between the graft copolymer (B2) and the polyhydroxyalkanoate.

A method for obtaining the graft copolymer (B2), especially the core-shell-type graft copolymer is not particularly limited. For example, a method can be used in which a monomer mixture containing desired amounts of the alkyl methacrylate monomer, the alkyl acrylate monomer, the aromatic vinyl monomer; the vinyl cyanide monomer, and the copolymerizable vinyl monomer is added to a rubber latex containing the acrylic rubber (b2) having a glass transition temperature of 0° C. or lower prepared in the above manner, and then a polymerization initiator or the like is added to perform polymerization by a common polymerization method to obtain a powdery graft copolymer from the obtained graft copolymer latex.

It is to be noted that the addition and polymerization of the monomer mixture as the shell layer is not particularly limited, and may be performed in one step or multiple steps. The addition of the monomer mixture is not particularly limited, and the monomer mixture may be added all at once, added continuously, or added by a combination of them in two or more divided steps.

The particles in the thus obtained core-shell-type graft copolymer latex are extracted from the latex by salting-out caused by addition of a common electrolyte or acid, coagulation, spraying into hot air, or drying. Further; the particles are washed, dehydrated, and dried by a common method, if necessary.

Hereinbelow, a diene-based rubber graft copolymer (hereinafter, also referred to as "graft copolymer (B3)") will be described which is obtained by graft polymerization of a vinyl-based monomer onto a diene-based rubber (b3) comprising a diene-based monomer.

The graft copolymer (B3) used in the present invention is not particularly limited, but the weight ratio between the diene-based rubber (b3) and the vinyl-based monomer is preferably diene-based rubber (b3)/vinyl-based monomer=15/85 to 90/10 (wt/wt).

The diene-based rubber (b3) used in the graft copolymer (B3) in the present invention is not particularly limited, but is preferably a rubber obtained by copolymerization of 50 to 100 wt % of a diene-based monomer, 50 to 0 wt % of another monofunctional vinyl-based monomer copolymerizable with the diene-based monomer, and 0 to 5 wt % of a polyfunctional monomer having 2 or more non-conjugated double bonds per molecule (wherein the total of the diene-based monomer, the another monofunctional vinyl-based monomer, and the polyfunctional monomer is 100 wt %).

Examples of the diene-based monomer include butadiene and isoprene, etc. Examples of the another monofunctional vinyl-based monomer copolymerizable with the diene-based monomer include a vinyl cyanide monomer, an aromatic vinyl monomer, an acrylate, and a methacrylate, etc. Examples of the polyfunctional monomer having 2 or more non-conjugated double bonds per molecule include diallyl phthalate, triallyl cyanurate, triallyl isocyanurate, allyl methacrylate, allyl acrylate, ethylene glycol dimethacrylate, diethylene glycol dimethacrylate, propylene glycol dimethacrylate, 1,3-butylene glycol dimethacrylate, 1,4-butylene glycol dimethacrylate, and divinyl benzene, etc. They may be used singly or in combination of two or more of them.

Specific examples of the diene-based rubber (b3) include butadiene rubber, styrene-butadiene rubber, acrylonitrile-butadiene rubber, acrylate-butadiene rubber, methacrylate-butadiene rubber, and isoprene rubber, etc.

The diene-based rubber (b3) can be obtained by polymerization such as solution polymerization or bulk polymerization. However, the diene-based rubber (b3) is preferably obtained by emulsion polymerization from the viewpoint of ease of graft polymerization, control of rubber particle diameter, and ease of blending of the graft copolymer with the polyhydroxyalkanoate.

The emulsion polymerization can be performed by a known method using, for example, a diene-based monomer, an aqueous medium, a known initiator such as a thermally-degradable initiator such as potassium peroxide or benzoyl peroxide, etc. or a redox initiator such as $FeSO_4$-reducing agent-organic peroxide, etc. and optionally, a chain transfer agent such as a mercaptan compound, an emulsifier, or the like.

Examples of the emulsifier used in the polymerization for obtaining the diene-based rubber (b3) include higher fatty acid sodium salts, higher fatty acid potassium salts, alkylbenzene sulfonic acid, sodium alkylbenzene sulfonate, alkyl sulfonic acid, sodium alkyl sulfonate, sodium (di)alkyl sulfosuccinate, sodium polyoxyethylenenonylphenyl ether sulfonate, and sodium alkyl sulfate, etc. They may be used singly or in combination of two or more of them.

The temperature at which the emulsion polymerization is performed to produce a rubber latex is preferably 10 to 90° C., more preferably 30 to 70° C. from the viewpoint of achieving an appropriate polymerization rate.

The average particle diameter of the diene-based rubber (b3) is preferably in the range of 0.05 to 1 μm, more preferably in the range of 0.1 to 0.6 μm. If the average particle diameter of the diene-based rubber (b3) is less than 0.05 μm, the effect of improving impact strength tends to be poor. If the average particle diameter of the diene-based rubber (b3) exceeds 1 μm, the diene-based rubber latex tends to be unstable.

It is to be noted that the average particle diameter of the diene-based rubber (b3) used in the present invention is the average diameter of 50 particles measured by observation with a transmission electron microscope.

The gel content of the diene-based rubber (b3) in the graft copolymer (B3) used in the present invention is preferably 50% or more, more preferably 70% or more from the viewpoint of improving impact strength.

It is to be noted that the gel content can be measured in the same manner as described above with reference to the composite rubber (b1).

The vinyl-based monomer graft polymerized onto the diene-based rubber (b3) in the graft copolymer (B3) used in the present invention is not particularly limited. Preferred specific examples of the vinyl-based monomer include: vinyl cyanide monomers such as acrylonitrile and methacrylonitrile, etc.; aromatic vinyl monomers such as styrene, α-methylstyrene, para-methylstyrene, etc.; acrylates such as methyl acrylate, butyl acrylate, glycidyl acrylate, and hydroxyethyl acrylate, etc.; and methacrylates such as methyl methacrylate, ethyl methacrylate, butyl methacrylate, glycidyl methacrylate, and hydroxyethyl methacrylate, etc. They may be used singly or in combination of two or more of them.

From the viewpoint of miscibility with the polyhydroxyalkanoate (A), the vinyl-based monomer preferably comprises 70 to 100 wt % of at least one vinyl-based monomer selected from the group consisting of a vinyl cyanide monomer, an aromatic vinyl monomer, an acrylate, and a methacrylate and 30 to 0 wt % of another vinyl-based monomer copolymerizable therewith. Examples of the another vinyl-based monomer copolymerizable with at least one vinyl-based monomer selected from the group consisting of a vinyl cyanide monomer, an aromatic vinyl monomer, an acrylate, and a methacrylate include maleic anhydride, phenyl maleimide, methacrylic acid, and acrylic acid, etc. They may be used singly or in combination of two or more of them.

The weight ratio between the diene-based rubber (b3) and the vinyl-based monomer in the graft copolymer (B3) used in the present invention is preferably diene-based rubber (b3)/vinyl-based monomer=15/85 to 90/10 (wt/wt), more preferably 40/60 to 80/20. If the ratio is less than 15/85, sufficient impact strength tends not to be observed due to a low rubber component content. If the ratio exceeds 90/10, the amount of the monomer to be grafted is small, and therefore when the obtained graft copolymer (B3) is blended with the polyhydroxyalkanoate (A), miscibility with the polyhydroxyalkanoate (A) as a matrix resin is poor so that impact strength tends to be reduced after all.

The graft polymerization can be performed by a common emulsion polymerization method. In the polymerization, a common radical polymerization initiator or chain transfer agent can be used.

Further, a so-called free polymer obtained by polymerization of the vinyl-based monomer in another polymerization machine may be added to the graft copolymer or may be added when the polyhydroxyalkanoate and the graft copolymer (B3) are blended. It is to be noted that the composition of the graft and the composition of the free polymer may be the same or different. However, when different, the composition of the graft and the composition of the free polymer are preferably miscible with each other from the viewpoint of physical properties.

When particles of the graft copolymer after the polymerization are blended with the polyhydroxyalkanoate, the polymer separated from an emulsion may be used or the emulsion may be directly used. As a method for separating the polymer, for example, a common method can be used in which the emulsion is coagulated by adding a metal salt such as calcium chloride, magnesium chloride, or magnesium sulfate, etc. or an acid such as hydrochloric acid or sulfuric acid, etc. to separate the polymer, and the polymer is washed with water, dehydrated, and dried. Alternatively, a spray drying method may also be used.

The amount of the graft copolymer (B) (i.e., the graft copolymers (B1), (B2), and (B3)) used in the present invention is 0.1 to 100 parts by weight with respect to 100 parts by weight of the polyhydroxyalkanoate (A). The amount of the graft copolymer (B) used is preferably 0.5 to 50 parts by weight, more preferably 0.5 to 30 parts by weight. If the amount of the graft copolymer (B) used is less than 0.1 parts by weight, the effect of improving impact strength tends to be poor. If the amount of the graft copolymer (B) used exceeds 100 parts by weight, biodegradability is inhibited or the resin composition tends to be soft due to a high rubber component content.

The aliphatic polyester resin composition according to the present invention contains pentaerythritol (C) as a crystal nucleating agent for the polyhydroxyalkanoate. In the present invention, the pentaerythritol increases the crystallization speed of the polyhydroxyalkanoate, and in addition, acts synergistically with the graft copolymer (B) to exert the effect of improving the impact strength and tensile elongation of the polyhydroxyalkanoate.

The pentaerythritol is a compound represented by the following formula (2)

[Chemical Formula 1]

(2)

The pentaerythritol is one of polyhydric alcohols, and is a white crystalline organic compound having a melting point of 260.5° C. The pentaerythritol is classified as a sugar alcohol, but is not derived from a natural product and can be synthesized by condensation of acetaldehyde and formaldehyde in a basic condition.

The pentaerythritol used in the present invention is not particularly limited as long as it is usually commonly available, and may be a reagent or an industrial product. Examples of the reagent include, but are not limited to, those manufactured by Wako Pure Chemical Industries, Ltd., Sigma-Aldrich Corporation, Tokyo Chemical Industry Co., Ltd., and Merck KGaA, etc. Examples of the industrial product include, but are not limited to, those manufactured by KOEI CHEMICAL CO., LTD. (product name: Pentarit) and TOYO CHEMICALS CO., LTD, etc.

Some commonly-available reagents and industrial products contain, as an impurity, an oligomer such as dipentaerythritol or tripentaerythritol, etc. generated by dehydration condensation of pentaerythritol. The oligomer does not have the effect of crystallizing the aliphatic polyester resin, but does not inhibit the crystallization effect of the pentaerythritol. Therefore, the pentaerythritol used in the present invention may contain the oligomer.

The amount of the pentaerythritol used in the present invention is not particularly limited as long as the crystallization of the polyhydroxyalkanoate (A) can be improved and impact strength and tensile elongation can be improved. However, in order to obtain the effect of the pentaerythritol as a crystal nucleating agent, the lower limit of the amount of the pentaerythritol contained is preferably 0.05 parts by weight, more preferably 0.1 parts by weight, even more preferably 0.5 parts by weight with respect to 100 parts by weight of the amount of the polyhydroxyalkanoate (A) contained. If the amount of the pentaerythritol is too large, there is a possibility where processing is difficult due to a reduced viscosity during melt processing. Therefore, the upper limit of the amount of the pentaerythritol contained is preferably 20 parts by weight, more preferably 10 parts by weight, even more preferably 8 parts by weight with respect to 100 parts by weight of the amount of the polyhydroxyalkanoate (A) contained.

The polyester resin composition according to the present invention is superior to the polyhydroxyalkanoate itself or a resin composition containing the polyhydroxyalkanoate and a sugar alcohol compound other than pentaerythritol in that its crystallization during processing stably progresses over a wide range of processing conditions, and therefore has the following advantages.

When the polyhydroxyalkanoate, especially poly(3-hydroxybutyrate-co-3-hydroxyhexanoate) (P3HB3HH) or poly(3-hydroxybutyrate-co-3-hydroxyvalerate) (P3HB3HV) is crystallized by cooling after heat melting, the progression of crystallization is influenced by the temperature of the resin during melting. More specifically, when the temperature of the resin during melting is higher, the crystallization of the resin is less likely to progress. For example, in the case of P3HB3HH, when the temperature of the resin during melting is higher in the range of the melting point of the resin to about 170° C., the crystallization of the resin is less likely to progress during cooling. When the temperature of the resin during melting is about 180° C. or higher, the crystallization of the resin during cooling tends to progress over several hours. Therefore, the temperature of the resin during melting needs to be controlled to be in the range of about 170 to 180° C. to satisfactorily perform molding processing. However, the temperature of the resin during melting is not uniform in general molding processing, and therefore it is very difficult to control the temperature of the resin during melting to be in the above temperature range.

The crystallization of the polyester resin composition according to the present invention stably progresses even when the temperature of the resin during melting is set over a wide range. More specifically, even when the temperature of the resin during melting is in the range of the melting point of the resin to about 190° C., the crystallization of the resin stably and quickly progresses. Therefore, the resin composition according to the present invention has excellent processing characteristics over a wide range of processing conditions. It is to be noted that from the viewpoint of thermal degradation, it is not preferred that melt processing is performed under conditions where the temperature of the resin during melting is 200° C. or higher.

Further, the progression of crystallization of the polyhydroxyalkanoate depends also on cooling temperature. For example, in the case of P3HB3HH, crystallization tends to most progress at a cooling temperature after heat melting of 50 to 70° C., and when the cooling temperature is lower than 50° C. or higher than 70° C., crystallization is less likely to progress. In general molding processing, a mold temperature correlates with a cooling temperature, and therefore needs to be controlled to be in the above temperature range, that is, in the range of 50 to 70° C. However, in order to uniformly control the mold temperature, the structure or shape of the mold needs to be tightly designed, which is very difficult.

The crystallization of the polyester resin composition according to the present invention stably progresses over a wide cooling temperature range after melting of the resin. More specifically, even when the cooling temperature after heat melting is in the range of 20 to 80° C., crystallization stably and quickly progresses. Therefore, the resin composition according to the present invention offers excellent processing characteristics over a wide range of processing conditions.

The polyester resin composition according to the present invention has the above advantages that cannot be obtained by a common polyhydroxyalkanoate resin or a resin composition containing a polyhydroxyalkanoate resin and a sugar alcohol compound other than pentaerythritol, and therefore has excellent processing characteristics in that the temperature of the resin during melting or the cooling temperature of a mold or the like can be set over a wide range.

The polyester resin composition according to the present invention has the following characteristics due to a stable and quick progression of crystallization.

For example, the crystallization of P3HB3HH does not sufficiently progress during molding, and therefore gradually progresses even after molding so that spherulites grow. For this reason, the obtained molded article tends to gradually become brittle due to a temporal change in mechanical properties. However, in the case of the polyester resin composition according to the present invention, many microcrystals are formed just after molding, and therefore spherulites are less likely to grow after molding. For this reason, the obtained molded article is excellent in the stability of product quality due to the suppression of embrittlement.

Further, there is a gap between mating parts providing a cavity of a mold for injection molding (e.g., a parting line portion, an insertion portion, or a slide core sliding portion), and therefore the melted resin enters the gap during injection molding so that the obtained molded article has "flash". Since the polyhydroxyalkanoate is slowly crystallized, the resin has flowability for a long time. Therefore, the obtained molded article is likely to have flash and requires much effort for post-processing. On the other hand, the polyester resin composition according to the present invention is preferred from a practical point of view, because it is quickly crystallized, and therefore the obtained molded article is less likely to have flash and an effort for the post-processing of the molded article can be reduced.

The polyester resin composition according to the present invention can be easily produced with a known melt-kneading machine as long as the melt-kneading machine can heat the polyhydroxyalkanoate to its melting point or higher and can perform kneading. For example, the polyester resin composition according to the present invention can be produced using a method in which the polyhydroxyalkanoate, the graft copolymer, the pentaerythritol, and if necessary, another component are melt-kneaded by, for example, an extruder, a roll-mill, or a Banbury mixer to prepare pellets, and the pellets are subjected to molding or a method in which the polyhydroxyalkanoate, the graft copolymer, and a previously-prepared masterbatch containing a high concentration of the pentaerythritol are blended in a desired ratio, melt-kneaded, and subjected to molding. The pentaerythritol, the graft copolymer, and the polyhydroxyalkanoate may be simultaneously added to the kneading machine. Alternatively, the pentaerythritol may be added after the polyhydroxyalkanoate and the graft copolymer are melted.

The polyester resin composition according to the present invention may contain any additive without impairing the effects of the present invention. Here, the additive can be used for any purpose, and examples thereof include a lubricant, a crystal nucleating agent other than pentaerythritol, a plasticizer, a hydrolysis inhibitor, an antioxidant, a releasing agent, an ultraviolet absorber, a coloring agent such as a dye or a pigment, and an inorganic filler, etc. These additives are preferably biodegradable.

Other examples of the additive include inorganic fibers such as carbon fibers, etc. and organic fibers such as human hair and wool, etc. Alternatively, natural fibers may also be used such as bamboo fibers, pulp fibers, kenaf fibers, other analogous plant alternatives, annual herbal plants of the genus Hibiscus in the family Malvaceous, or annual herbal plants in the family Tiliaceous. From the viewpoint of reducing carbon dioxide, plant-derived natural fibers are preferred, and kenaf fibers are particularly preferred.

Hereinbelow, a method for producing a molded article comprising the polyester resin composition according to the present invention will be exemplified.

First, the PHA, the graft copolymer, the pentaerythritol, and if necessary, one or more of the above additives were melt-kneaded using, for example, an extruder, a kneader, a Banbury mixer, or a roller to prepare a polyester resin composition. Then, the polyester resin composition is extruded in the form of strand and cut to obtain pellets of the polyester resin composition having a particulate shape such as a columnar shape, an elliptic columnar shape, a spherical shape, a cubic shape, or a rectangular parallelepiped shape, etc.

The temperature at which the PHA, the graft copolymer, etc. are melt-kneaded in such a manner as described above depends on the melting point or melt viscosity of the PHA used, the melt viscosity of the graft copolymer, or the like, and therefore cannot be unconditionally determined, but the resin temperature of the melt-kneaded product at the outlet of a die is preferably 140 to 200° C., more preferably 150 to 195° C., even more preferably 160 to 190° C. If the resin temperature of the melt-kneaded product is lower than 140° C., there is a possibility where the graft copolymer is poorly dispersed. If the resin temperature of the melt-kneaded product exceeds 200° C., there is a possibility where the PHA is thermally decomposed.

The pellets prepared by the above method are sufficiently dried at 40 to 80° C. to remove moisture, and then can be molded and processed by a known molding processing method to obtain any molded article. Examples of the molding processing method include film forming, sheet forming, injection molding, blow molding, fiber spinning, extrusion foaming, and bead foaming, etc.

Examples of a method for forming a film include T-die extrusion molding, calender molding, roll forming, and inflation molding. However, the film forming method is not limited thereto. The temperature at which film forming is performed is preferably 140 to 190° C. Further, a film obtained from the polyester resin composition according to the present invention can be subjected to thermoforming involving heating, vacuum molding, or press molding.

Examples of a method that can be used for producing an injection molded article include injection molding methods such as an injection molding method commonly used when a thermoplastic resin is molded, a gas assist molding method, and an injection compression molding method. Alternatively, depending on intended use, a method other than the above methods may be used, such as an in-mold molding method, a gas press molding method, a two-color molding method, a sandwich molding method, PUSH-PULL, or SCORIM, etc. However, the injection molding methods are not limited thereto. The temperature at which injection molding is performed is preferably 140 to 190° C., and the temperature of a mold is preferably 20 to 80° C., more preferably 30 to 70° C.

The molded article according to the present invention can be appropriately used in the fields of agriculture, fishery, forestry, gardening, medicine, sanitary goods, food industry, clothing, non-clothing, packaging, cars, building materials, etc.

EXAMPLES

Hereinbelow, the present invention will be described specifically with reference to the following examples, but the technical scope of the present invention is not limited to these examples.

Polyhydroxyalkanoate as Raw Material A1: A polyhydroxyalkanoate obtained in Production Example 1 was used.

Production Example 1

Culture Production was Performed Using KNK-005 Strain (See U.S. Pat. No. 7,384,766)

The composition of a seed medium was as follows: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$ (pH6.8).

The composition of a preculture medium was as follows: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (obtained by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$). As a carbon source, palm oil was added at a time at a concentration of 10 g/L.

The composition of a PHA production medium was as follows: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (obtained by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$), and 0.05 w/v % BIOSPUREX200K (defoaming agent: manufactured by Cognis Japan Ltd.).

First, a glycerol stock (50 μL) of KNK-005 strain was inoculated into the seed medium (10 mL) and seed-cultured for 24 hours. Then, the obtained seed culture was inoculated at 1.0 v/v % into 1.8 L of the preculture medium contained in a 3-liter jar fermenter (MDL-300 manufactured by B. E. MARUBISHI Co., Ltd.). The jar fermenter was operated under conditions where a culture temperature was 33° C., a stirring speed was 500 rpm, and a ventilation volume was 1.8 L/min to perform preculture for 28 hours while pH was controlled to be in the range of 6.7 to 6.8. The pH control was performed using a 14% aqueous ammonium hydroxide solution.

Then, the obtained preculture was inoculated at 1.0 v/v % into 6 L of the production medium contained in a 10-liter jar fermenter (MDS-1000 manufactured by B. E. MARUBISHI Co., Ltd.). The jar fermenter was operated under conditions where a culture temperature was 28° C., a stirring speed was 400 rpm, and a ventilation volume was 6.0 L/min while pH was controlled to be in the range of 6.7 to 6.8. The pH control was performed using a 14% aqueous ammonium hydroxide solution. As a carbon source, palm oil was used. Culture was performed for 64 hours. After the completion of the culture, cells were collected by centrifugation, washed with methanol, and lyophilized to obtain dried cells, and the weight of the dried cells was measured.

Then, 100 mL of chloroform was added to 1 g of the obtained dried cells, and the obtained cell suspension was stirred at room temperature all day and night to extract PHA in the cells. Cell debris was removed by filtration, and then the obtained filtrate was concentrated in an evaporator until the total volume of the filtrate was reduced to 30 mL to obtain a concentrate. Then, 90 mL of hexane was added to the concentrate little by little, and the obtained mixture was allowed to stand for 1 hour while gently stirred. The deposited PHA was separated by filtration and vacuum-dried at 50° C. for 3 hours. In this way, PHA was obtained. The 3HH content of the obtained PHA was analyzed by gas chromatography measurement in the following manner. Two milliliters of a mixed solution of sulfuric acid and methanol (15:85) and 2 mL of chloroform were added to 20 mg of the dry PHA, and the obtained mixture was hermetically sealed and heated at 100° C. for 140 minutes to obtain a methyl ester of a PHA degradation product. After cooling, 1.5 g of sodium hydrogen carbonate was added thereto little by little for neutralization, and the obtained mixture was allowed to stand until the generation of carbon dioxide was stopped. Then, 4 mL of diisopropyl ether was added to and well mixed with the mixture, and then the obtained mixture was centrifuged to obtain a supernatant. Then, the monomer unit composition of the polyester degradation product in the supernatant was analyzed by capillary gas chromatography. The gas chromatography was performed using a gas chromatograph "GC-17A" manufactured by SHIMADZU CORPORATION and a capillary column "NEUTRA BOND-1" (column length: 25 m, column inner diameter: 0.25 mm, liquid film thickness: 0.4 μm) manufactured by GL Sciences Inc. Helium gas was used as a carrier gas, a column inlet pressure was 100 kPa, and the amount of a sample injected was 1 μL. Temperature conditions were as follows: temperature rise was performed at a rate of 8° C./min from an initial temperature of 100° C. to 200° C., and temperature rise was further performed at a rate of 30° C./min from 200 to 290° C. As a result of the analysis performed under the above conditions, the PHA was found to be poly(3-hydroxybutyrate-co-3-hydroxyhexanoate) (P3HB3HH) represented by the chemical formula (1). The PHA had a 3-hydroxybutyrate (3HB) content of 94.4 mol % and a 3-hydroxyhexanoate (3HH) content of 5.6 mol %.

After the completion of the culture, P3HB3HH was obtained from the obtained cell culture by a method described in WO 2010/067543. The weight-average molecular weight Mw of the P3HB3HH as measured by GPC was 600000.

Polyhydroxyalkanoate as Raw Material A2: A Polyhydroxyalkanoate Obtained in Production Example 2 was Used.

Production Example 2

A polyhydroxyalkanoate as Raw Material A2, P3HB3HH was obtained in the same manner as in Production Example 1 except that KNK-631 strain (see WO 2009/145164) was used instead of KNK-005 strain. The polyhydroxyalkanoate as Raw Material A2 had a weight-average molecular weight Mw of 620000, a 3HB content of 92.2 mol %, and a 3HH content of 7.8 mol %.

Polyhydroxyalkanoate as Raw Material A3: A Polyhydroxyalkanoate Obtained in Production Example 3 was Used.

Production Example 3

A polyhydroxyalkanoate as Raw Material A3, P3HB3HH was obtained in the same manner as in Production Example 1 except that KNK-631 strain was used and palm kernel oil was used as a carbon source. The polyhydroxyalkanoate as Raw Material A3 had a weight-average molecular weight Mw of 650000, a 3HB content of 88.6 mol %, and a 3HH content of 11.4 mol %.

Polyhydroxyalkanoate as Raw Material A4: Poly(3-hydroxybutyrate-co-3-hydroxyvalerate) (3HB Content: 95 Mol %, 3HV Content: 5 Mol %) Manufactured by Sigma-Aldrich Corporation was Used.

Polyhydroxyalkanoate as Raw Material A5: EM5400F (poly(3-hydroxybutyrate-co-4-hydroxybutyrate)) Manufactured by Ecomann was Used.

Graft copolymers B1 to B5: The following products were used.

B1: "Kane Ace M-581H" manufactured by KANEKA CORPORATION

B2: "Kane Ace M-400" manufactured by KANEKA CORPORATION

B3: "Kane Ace M-711" manufactured by KANEKA CORPORATION

B4: "METABLEN W-450A" manufactured by MITSUBISHI RAYON CO., LTD.

B5: "METABLEN S-2001" manufactured by MITSUBISHI RAYON CO., LTD.

Kane Ace M-581H is particles obtained by graft copolymerization of 15 wt % of methyl methacrylate as a vinyl-based monomer onto 85 wt % of an acrylic rubber (polybutyl acrylate).

Kane Ace M-400 is particles obtained by graft copolymerization of 8 wt % of methyl methacrylate as a vinyl-based monomer onto 92 wt % of an acrylic rubber (polybutyl acrylate).

Kane Ace M-711 is particles obtained by graft copolymerization of 22 wt % of methyl methacrylate as a vinyl-based monomer onto 78 wt % of a diene-based rubber (polybutadiene).

METABLEN W-450A is particles obtained by graft copolymerization of methyl methacrylate as a vinyl-based monomer onto an acrylic rubber (polybutyl acrylate).

METABLEN S-2001 is particles obtained by graft copolymerization of methyl methacrylate as a vinyl-based monomer onto a silicone-acrylic composite rubber (polyorganosiloxane and polybutyl acrylate).

Example 1

(Production of Polyester Resin Composition)

The polyhydroxyalkanoate as Raw Material A1, the graft copolymer B1, and pentaerythritol (manufactured by Wako Pure Chemical Industries, Ltd.) were blended in a blending ratio shown in Table 1 (in the following tables, the blending ratio is expressed in parts by weight) and melt-kneaded using a co-rotating intermeshing twin screw extruder (TEX 30 manufactured by The Japan Steel Works, LTD.) at a preset temperature of 120 to 140° C. and a screw rotation speed of 100 rpm to obtain a polyester resin composition. The temperature of the resin was measured by directly measuring the temperature of the melted resin extruded from a die with a K-type thermocouple. The polyester resin composition was molded into the form of strand through the die and cut into pellets.

(Injection Molding)

The obtained resin composition was used as a raw material and molded into bar specimens based on ASTM D-256 and dumbbell specimens based on ASTM D-638 using an injection molding machine (IS-75E manufactured by TOSHIBA MACHINE CO., LTD.) under conditions where the cylinder preset temperature of the molding machine was 120 to 140° C. and the preset temperature of a mold was 55° C. The actual temperature of the resin during molding was measured by the contact of the injected resin with a K-type thermocouple, and the actual temperature of the mold was measured by the contact of the surface of the mold with a K-type thermocouple. The measured actual temperature of the mold is shown in each table as mold temperature.

(Releasability)

The processability of the polyester resin composition according to the present invention was evaluated in terms of release time. The release time was defined as the time required for the resin injected into a mold to prepare a specimen to be released from the opened mold by ejecting the specimen with an ejection pin without deforming the specimen. The shorter release time means that crystallization is faster and molding processability is better and has improved.

(Izod Impact Strength)

The bar specimen obtained by injection molding was subjected to an Izod impact test at 23° C. in accordance with ASTM D-256 to measure Izod impact strength. The higher Izod impact strength, the better.

(Tensile Elongation at Break)

The dumbbell specimen obtained by injection molding was subjected to tensile measurement at 23° C. in accordance with ASTM D-638 to measure tensile elongation at break. The higher tensile elongation at break, the better.

Examples 2 to 7

Pellets of a polyester resin composition were prepared in the same manner as in Example 1 except that the blending ratio was changed as shown in Table 1, and the release time in injection molding and the Izod impact strength and tensile elongation at break of obtained specimens were measured. The results are shown in Table 1.

Comparative Examples 1 to 6

Pellets of a polyester resin composition were prepared in the same manner as in Example 1 except that the blending ratio was changed as shown in Table 1, and the release time in injection molding and the Izod impact strength and tensile elongation at break of obtained specimens were measured. The results are shown in Table 1.

TABLE 1

| | | | Examples | | | | | | | Comparative Examples | | | | | |
|---|---|---|---|---|---|---|---|---|---|---|---|---|---|---|---|
| | | | 1 | 2 | 3 | 4 | 5 | 6 | 7 | 1 | 2 | 3 | 4 | 5 | 6 |
| Raw Materials | Polyhydroxyalkanoate | Raw Material A1 | 100 | 100 | 100 | 100 | 100 | 100 | 100 | 100 | 100 | 100 | 100 | 100 | 100 |
| | Graft Copolymer | B1 | 20 | 40 | 10 | | | | | | 20 | | | | |
| | Graft Copolymer | B2 | | | | 20 | | | | | | 20 | | | |
| | Graft Copolymer | B3 | | | | | 20 | | | | | | 20 | | |
| | Graft Copolymer | B4 | | | | | | 20 | | | | | | 20 | |
| | Graft Copolymer | B5 | | | | | | | 20 | | | | | | 20 |
| | Pentaerythritol | — | 1 | 2 | 1 | 1 | 1 | 1 | 1 | 1 | 0 | 0 | 0 | 0 | 0 |
| Melt-Kneading | Resin Temperature | ° C. | 169 | 171 | 168 | 166 | 168 | 169 | 168 | 168 | 170 | 168 | 169 | 171 | 169 |
| Injection | Mold Temperature | ° C. | 59 | 58 | 57 | 57 | 57 | 58 | 58 | 58 | 55 | 54 | 55 | 55 | 55 |
| Molding | Release Time | sec | 20 | 25 | 20 | 20 | 25 | 20 | 20 | 20 | >60 | >60 | >60 | >60 | >60 |
| Specimen | Izod Impact Strength | J/m | 80 | 153 | 51 | 65 | 49 | 55 | 82 | 24 | 50 | 53 | 41 | 43 | 68 |
| Physical Properties | Tensile Elongation at Break | % | 98 | 231 | 63 | 80 | 42 | 161 | 30 | 12 | 18 | 16 | 15 | 19 | 18 |

As shown in Table 1, in Comparative Example 1, the release time of the molded articles was as short as 20 seconds, but the Izod impact strength was as low as 24 J/m and the tensile elongation at break was as low as 12% for lack of the graft copolymer. In Comparative Examples 2 to 6, the Izod impact strength was improved, but the release time was 60 seconds or more for lack of the pentaerythritol. On the other hand, in Examples 1 to 7, the release time in injection molding was 25 seconds or less as a result of the combined use of the pentaerythritol and the graft copolymer, and the Izod impact strength and the tensile elongation at break were improved as compared to Comparative Examples 2 to 6 using the graft copolymer alone. It was found that the combined use of the pentaerythritol and the graft copolymer not only shortened the release time but also improved toughness and ductility due to synergistic effect.

Examples 8 to 11

Comparative Examples 7 to 14

Pellets of a polyester resin composition were prepared in the same manner as in Example 1 except that the blending ratio was changed as shown in Table 2, and the release time in injection molding and the tensile elongation at break of obtained specimens were measured. The results are shown in Table 2.

TABLE 2

|  |  |  | Examples |  |  |  | Comparative Examples |  |  |  |  |  |  |  |
|---|---|---|---|---|---|---|---|---|---|---|---|---|---|---|
|  |  |  | 8 | 9 | 10 | 11 | 7 | 8 | 9 | 10 | 11 | 12 | 13 | 14 |
| Raw Materials | Polyhydroxyalkanoate | Raw Material A2 | 100 |  |  |  | 100 | 100 |  |  |  |  |  |  |
|  | Polyhydroxyalkanoate | Raw Material A3 |  | 100 |  |  |  |  | 100 | 100 |  |  |  |  |
|  | Polyhydroxyalkanoate | Raw Material A4 |  |  | 100 |  |  |  |  |  | 100 | 100 |  |  |
|  | Polyhydroxyalkanoate | Raw Material A5 |  |  |  | 100 |  |  |  |  |  |  | 100 | 100 |
|  | Graft Copolymer | B1 | 20 | 20 | 20 | 20 | 20 | 0 | 20 | 0 | 20 | 0 | 20 | 0 |
|  | Pentaerythritol | — | 1 | 3 | 1 | 2 | 0 | 1 | 0 | 3 | 0 | 1 | 0 | 2 |
| Melt-Kneading | Resin Temperature | °C. | 168 | 166 | 170 | 169 | 169 | 168 | 169 | 167 | 171 | 169 | 171 | 169 |
| Injection | Mold Temperature | °C. | 58 | 57 | 58 | 57 | 55 | 59 | 54 | 58 | 55 | 58 | 55 | 28 |
| Molding | Release Time | sec | 20 | 30 | 20 | 20 | >60 | 20 | >60 | 25 | >60 | 20 | >60 | 20 |
| Specimen | Izod Impact Strength | J/m | 90 | 211 | 85 | 225 | 54 | 26 | 63 | 31 | 53 | 21 | 69 | 33 |
| Physical Properties | Tensile Elongation at Break | % | 117 | >300 | 81 | >300 | 18 | 12 | >300 | 152 | 13 | 9 | >300 | >300 |

As shown in Table 2, in Comparative Examples 7, 9, 11, and 13, the Izod impact strength was improved as compared to Comparative Examples 8, 10, 12, and 14, but the release time was long for lack of the pentaerythritol. In Comparative Examples 8, 10, 12, and 14, the release time of the molded article was satisfactory, but the Izod impact strength and the tensile elongation at break were low for lack of the graft copolymer. On the other hand, in Examples 8 to 11, the release time in injection molding was short as a result of the combined use of the pentaerythritol and the graft copolymer, and the hod impact strength and the tensile elongation at break were improved, from which it was found that processability and both toughness and ductility were excellent.

The invention claimed is:

1. An aliphatic polyester resin composition, comprising:
a polyhydroxyalkanoate (A);
a graft copolymer (B); and
pentaerythritol (C),
wherein the graft copolymer (B) is obtained by graft polymerization of a vinyl-based monomer onto at least one rubber selected from the group consisting of a composite rubber (b1) comprising a polyorganosiloxane component and a polyalkyl(meth)acrylate component, an acrylic rubber (b2), and a diene-based rubber (b3) comprising a diene-based monomer,
wherein an amount of the graft copolymer (B) is from 10 to 30 parts by weight with respect to 100 parts by weight of the polyhydroxyalkanoate (A), and
wherein an amount of the pentaerythritol (C) is from 1 to 3 parts by weight with respect to 100 parts by weight of the polyhydroxyalkanoate (A).

2. The aliphatic polyester resin composition according to claim 1, wherein the vinyl-based monomer in the graft copolymer (B) comprises from 70 to 100 wt % of a first vinyl-based monomer which comprises at least one selected from the group consisting of a vinyl cyanide monomer, an aromatic vinyl monomer, an acrylate, and a methacrylate, and from 30 to 0 wt % of a second vinyl-based monomer copolymerizable with the first vinyl-based monomer.

3. The aliphatic polyester resin composition according to claim 1, wherein the graft copolymer (B) is obtained by graft polymerization of the vinyl-based monomer onto the at least one rubber comprising the acrylic rubber (b2), the acrylic rubber (b2) mainly comprises an acrylate as a monomer unit, and the vinyl-based monomer includes an alkyl methacrylate.

4. The aliphatic polyester resin composition according to claim 1, wherein the graft copolymer (B) is obtained by graft polymerization of the vinyl-based monomer onto the at least one rubber comprising the diene-based rubber (b3),
the diene-based rubber (b3) is obtained by copolymerization of from 50 to 100 wt % of a diene-based monomer, from 50 to 0 wt % of a monofunctional vinyl-based monomer copolymerizable with the diene-based monomer, and from 0 to 5 wt % of a polyfunctional monomer having a plurality of non-conjugated double bonds in one molecule, provided that a sum of the diene-based monomer, the another monofunctional vinyl-based monomer, and the polyfunctional monomer is 100 wt %, and
the diene-based rubber (b3) and the vinyl-based monomer graft polymerized onto the diene-based rubber (b3) satisfy a weight ratio, wt/wt:

diene-based rubber (b3)/vinyl-based monomer =15/85 to 90/10.

5. The aliphatic polyester resin composition according to claim 1, wherein the polyhydroxyalkanoate (A) includes a repeating unit of the formula (1):

[—CHR—CH$_2$—CO—O—]     (1), wherein R is an alkyl group represented by $C_nH_{2n+1}$, and n is an integer of 1 to 15.

6. The aliphatic polyester resin composition according to claim 1, wherein the polyhydroxyalkanoate (A) comprises at least one selected from the group consisting of a poly(3-hydroxybutyrate) homopolymer resin, a poly(3-hydroxybutyrate-co-3-hydroxyvalerate) copolymer resin, a poly(3-hydroxybutyrate-co-3-hydroxyvalerate-co-3-hydroxyhexanoate) copolymer resin, a poly(3-hydroxybutyrate-co-3-hydroxyhexanoate) copolymer resin, and a poly(3-hydroxybutyrate-co-4-hydroxybutyrate) copolymer resin.

7. A polyester resin molded article produced by a process comprising molding the aliphatic polyester resin composition according to claim 1.

8. The aliphatic polyester resin composition according to claim 1, wherein the graft copolymer (B) is obtained by graft polymerization of the vinyl-based monomer onto the acrylic rubber (b2).

9. The aliphatic polyester resin composition according to claim 4, wherein the diene-based rubber (b3) and the vinyl-based monomer graft polymerized onto the diene-based rubber (b3) satisfy the weight ratio, wt/wt:

diene-based rubber (b3)/vinyl-based monomer =40/60 to 80/20.

* * * * *